United States Patent
Yamanaka

(10) Patent No.: US 8,320,055 B2
(45) Date of Patent: Nov. 27, 2012

(54) LENS BARREL AND OPTICAL APPARATUS

(75) Inventor: Takumi Yamanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/184,848

(22) Filed: Jul. 18, 2011

(65) Prior Publication Data

US 2012/0019932 A1 Jan. 26, 2012

(30) Foreign Application Priority Data

Jul. 20, 2010 (JP) .................................. 2010-163186

(51) Int. Cl.
*G02B 15/14* (2006.01)
*G02B 7/02* (2006.01)

(52) U.S. Cl. .......... 359/694; 359/696; 359/823; 396/91; 396/144

(58) Field of Classification Search .......... 359/694–701, 359/819, 823–826, 830; 396/91, 133, 134, 396/144

See application file for complete search history.

(56) References Cited

U.S. PATENT DOCUMENTS

| 6,879,445 B2 * | 4/2005 | Hamasaki ..................... 359/696 |
| 7,099,576 B2 * | 8/2006 | Hamasaki et al. ............. 396/144 |
| 7,102,837 B2 * | 9/2006 | Hamasaki et al. ............. 359/823 |
| 7,552,455 B2 * | 6/2009 | Kimura et al. ................. 720/681 |

FOREIGN PATENT DOCUMENTS

JP 2004-233381 A 8/2004

* cited by examiner

*Primary Examiner* — Loha Ben

(74) *Attorney, Agent, or Firm* — Canon USA Inc IP Division

(57) ABSTRACT

A lens barrel showing a satisfactory property in assembly and a high dust-proof and drip-proof performance includes: a first member; a lens holding frame configured to hold lens units moving in an optical axis direction to either zoom or focus the lens units; and an elastic member held between respective optical-axis-orthogonal surfaces of the first member and the lens holding frame, wherein the elastic member can be compressed in the optical axis direction during a zooming or focusing operation.

7 Claims, 3 Drawing Sheets

LENS BARREL AND OPTICAL APPARATUS

BACKGROUND OF THE INVENTION

1. Field of the Invention

The present invention relates to a dust-proof and drip-proof structure for a lens barrel.

2. Description of the Related Art

A lens barrel, which has lens movement units arranged inside a stationary member and configured to advance and retreat in an optical axial direction to focus and zoom, has had a problem in that sand, dust, water, etc. can enter through a gap of a lens movement frame in a radial direction which holds the stationary member and the lens movement units.

To cope with this problem, a bellows-like member is arranged inside the lens barrel which is expandable in the optical axis direction.

A bellows is a structure which is formed of a film or a plate-like member and which shows crests and troughs alternately arranged.

However, in the conventional technique as discussed in Japanese Patent Application Laid-Open No. 2004-233381, it is necessary to fix the bellows member to the stationary member and the movable member respectively, resulting in a poor assembly property.

SUMMARY OF THE INVENTION

The present invention is directed to a lens barrel showing a satisfactory property in assembly and a high dust-proof and drip-proof property.

According to an aspect of the present invention, a lens barrel includes: a first member; a lens holding frame configured to hold lens units moving in an optical axis direction to either zoom or focus the lens units; and an elastic member held between respective optical-axis-orthogonal surfaces of the first member and the lens holding frame, wherein the elastic member is compressed in the optical axis direction during a zooming or focusing operation.

According to the present invention, it is possible to provide a lens barrel showing a satisfactory property in assembly and a high dust-proof and drip-proof property.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
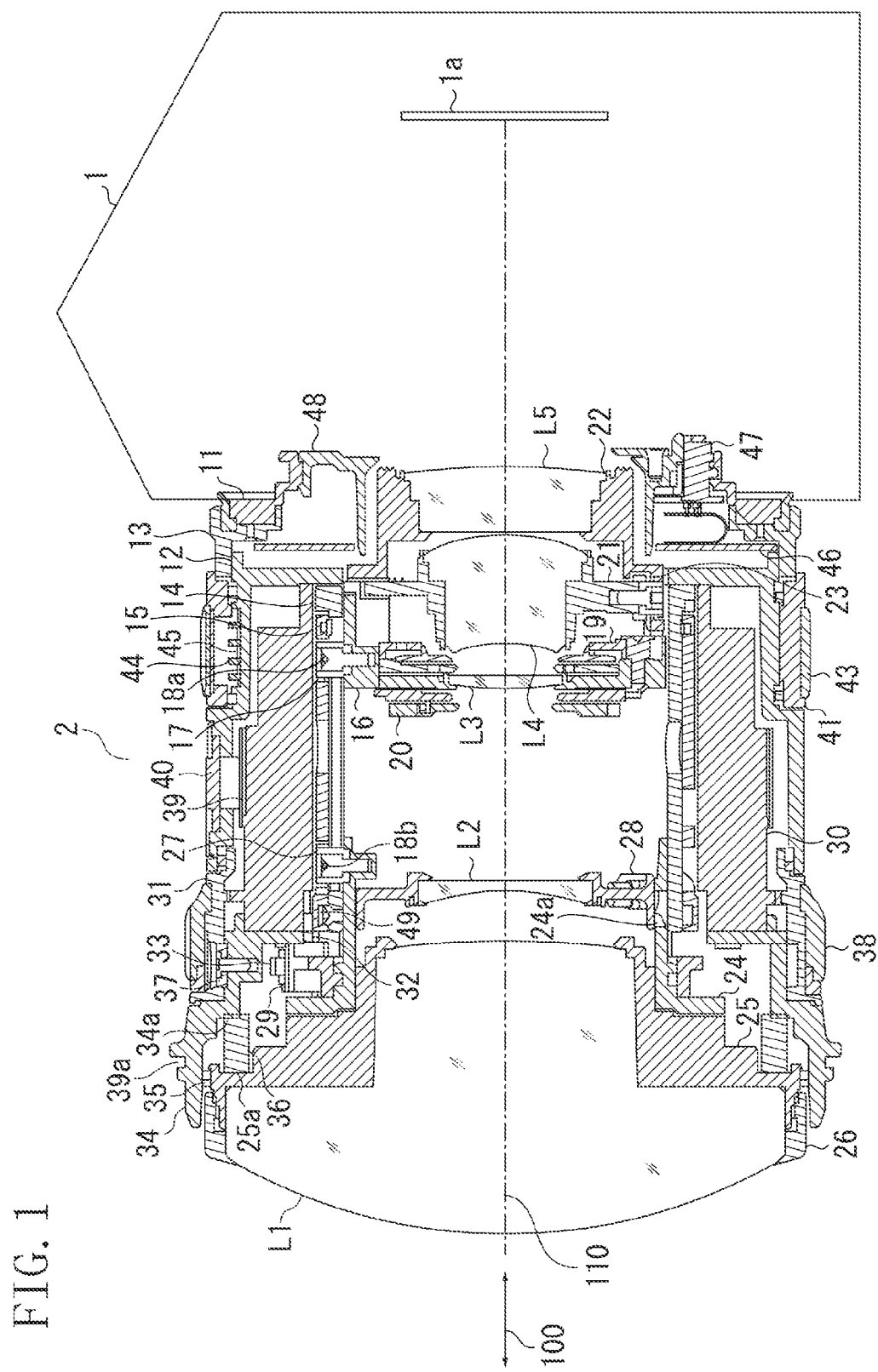
FIG. 1 is a sectional view of a lens barrel according to an exemplary embodiment of the present invention in a wide state.

FIG. 1 is a sectional view schematically illustrating the inner structure of an interchangeable lens for a single-lens reflex camera according to an exemplary embodiment in the WIDE state, and a camera main body to which the interchangeable lens as a lens barrel is attached.

In the present exemplary embodiment, the interchangeable lens and the camera main body to which it is attached will be collectively referred to as an optical apparatus.

Figure 2:
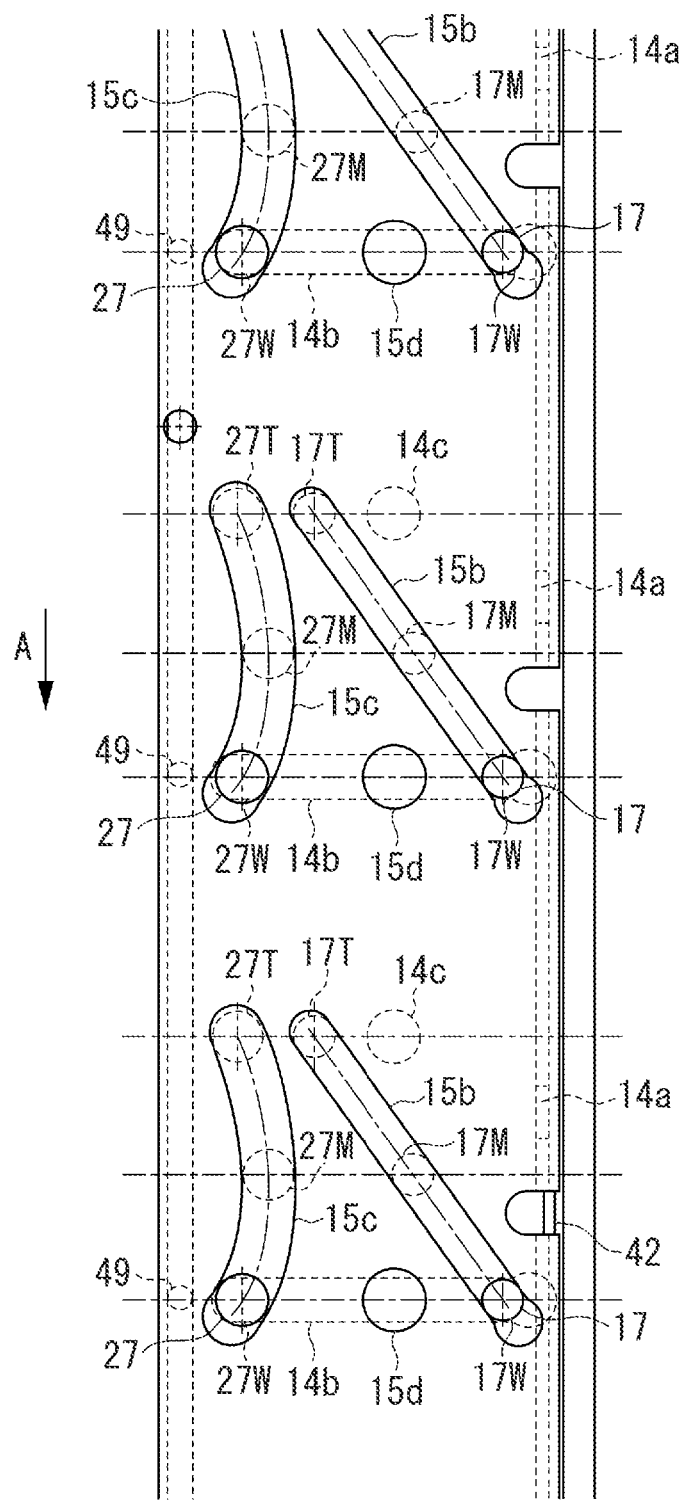
FIG. 2 is a developed view of a lens barrel according to an exemplary embodiment.

FIG. 2 is a developed view of a main portion of an interchangeable lens 2 according to the present exemplary embodiment in the WIDE state.

First, the general construction of the lens barrel mechanism will be described with reference to FIG. 1.

The interchangeable lens 2 is detachably attached to a camera main body 1; an imaging sensor 1a is provided inside the camera main body 1. The interchangeable lens 2 is a five-unit zoom lens having a first lens unit L1, a second lens unit L2, a third lens unit L3, a fourth lens unit L4, and a fifth lens unit L5 in that order from the object side.

The first lens unit L1 and the second lens unit L2 (i.e. the first two units), and the third lens unit L3, the fourth lens unit L4, and the fifth lens unit L5 (i.e. the second three units), are zooming lens units configured to move integrally in the optical axis direction 100, which is parallel with an optical axis 110, at the time of zooming operation.

Of the above lens units, the second lens unit L2 also serves as a focusing lens unit configured to move in the optical axis direction 100 at the time of focusing operation.

A mount 11 for mounting the interchangeable lens 2 to the camera main body 1 has a bayonet portion, and is fixed to a stationary tube 12 by screws. A mount ring 13 is fixed in position while sandwiched between the mount 11 and the stationary tube 12.

A guide tube 14 is fastened to the stationary tube 12 by screws to be fixed to the camera main body 1. In the outer periphery of the guide tube 14, three bayonet claws 14a are arranged at equal circumferential intervals.

The cam tube 15 is held rotatable around the optical axis 110 owing to engagement between a bayonet groove 15a formed in the inner periphery thereof and a bayonet groove 14a of the guide tube 14.

A third unit holding frame 16 is configured to retain the third lens unit L3. A third lens unit frame movement roller 17 is fixed to the third unit holding frame 16 by a shaft screw 18a.

An electromagnetic diaphragm unit 19 composed of a diaphragm driving portion and a diaphragm blade portion, and a sub diaphragm unit 20 are fixed to the third unit holding frame 16 by screws. A fourth unit holding frame 21 retaining the fourth lens unit L4 is fixed on the imaging surface side to the rear end of the third unit holding frame 16 by screws.

The fifth unit holding frame 22 retaining the fifth lens unit L5 performs parallel eccentricity adjustment on the fourth unit holding frame 21. Thus, it is retained on the fourth unit holding frame 21 by means of an eccentricity roller 23. The parallel eccentricity adjustment structure using an eccentricity roller is well-known in the art, therefore a description thereof will be omitted.

A first unit holding frame 25 configured to retain the first lens unit L1 is fixed to an end surface of the rectilinear motion tube 24 by screws. The first lens unit L1 is fixed by a lens holder ring 26. A rectilinear motion tube movement roller 27 is fixed to the rectilinear motion tube 24 by a shaft screw 18b.

When the cam tube 15 is rotated, a rectilinear motion groove 14b provided in the guide groove 14 and extending in the optical axis direction 100, and the intersection of a third unit cam groove 15b and a rectilinear motion tube cam groove 15c provided in the cam tube 15, are caused to move. As the intersection moves, the third unit holding frame 16 and the rectilinear motion tube 24 move in the optical axis direction 100 via the respective movement rollers (cam follower pins).

A second unit holding frame 28, which is a focusing lens unit holding frame, retains the second lens unit L2, which is a focusing lens unit, and a cam follower pin provided in the outer periphery is engaged with a cam groove 24a provided in the rectilinear motion tube 24. The cam follower pin extending from the second unit holding frame 28 extends through the cam groove 24a, and is also engaged with a rectilinear motion groove (not illustrated) provided in a focus fixed position rotary tube 29. The focus fixed position rotary tube 29 is retained so as to be capable of fixed-position rotation with respect to the rectilinear motion tube 24 through bayonet connection.

A focusing unit 30 is fixed to the guide tube 14 by screws. The focusing unit 30 is mainly formed by a vibration type motor and a differential mechanism, and outputs the rotation amount of the vibration type motor and the rotation amount of a focus key 32 corresponding to the rotation amount of a manual ring 31.

The focus key 32 is engaged with a focus transmission key 33 fixed to the focus fixed position rotary tube 29.

A hood frame 34 (first member) is fixed to the front side of the focusing unit 30 by a screw. A bayonet portion is provided in the outer periphery of the distal end of the hood frame 34, enabling attachment of a hood, which is an accessory (not illustrated).

In the gap between the hood frame 34 and the first unit holding frame 25, a terenmp 35 which is black light shielding cloth that does not allow entrance of light into the inside, is wound around the optical axis 110. Further, between an optical-axis-orthogonal surface 25a of the first unit holding frame 25 and an optical-axis-orthogonal surface 34a of the hood frame 34, an annular elastic member 36 is arranged, which is set up to fill the gap always generated between the two components in the optical axis direction 100, even when the first unit holding frame 25 advances or retreats in the optical axis direction 100 in zooming.

Manual ring comas are fixed to the hood frame 34 by screws; they retain the manual ring 31 to enable fixed-position rotation with respect to the hood frame 34. The manual ring comas 37 are arranged at three circumferential positions. A manual ring rubber member 38 is wrapped around the outer periphery of the manual ring 31.

A scale sheet 39 rotates integrally with the focus key 32, which is the output of the focusing unit 30, to indicate a focus position in conjunction with a scale window 40.

A zoom ring 41 is a member to be rotated by the user at the time of zooming operation; it is retained to be capable of fixed-position rotation with respect to the stationary tube 12. A zoom key 42 is fixed to the zoom ring 41 by a screw. The zoom key 42 is engaged with a zoom key engagement groove 15f formed in the cam tube 15; when the zoom ring 41 is rotated, the cam tube 15 can be integrally rotated via the zoom key 42 by the rotational force. A zoom rubber member 43 is wrapped around the outer periphery of the zoom ring 41.

A zoom brush 44 is fixed to the zoom ring 41 by a screw; it is configured to slide on a grey code pattern of an encoder flexible substrate 45 to detect the positional relationship between the zoom ring 41 and the encoder flexible substrate 45.

A main substrate 46 is electrically connected to the focusing unit 30, the electromagnetic diaphragm unit 19, and the encoder flexible substrate 45 directly or via a flexible substrate to perform various control operations.

A contact block 47 is fixed to the mount 11 by a screw and connected to the main substrate 46 via the flexible substrate; it is provided to perform communication with the camera main body and power supply.

A back cover 48 is elastically connected with the mount 11 to cut off, or at least partially eliminate harmful light.

A pin 49 is in the same phase as the rectilinear motion groove 14b of the guide tube 14 and is arranged apart from the bayonet claw 14a in the optical axis direction 100 with the cam groove of the cam tube 15 in between.

In the interchangeable lens, constructed as described above, when the zoom ring 41 is rotated, the cam tube 15 is rotated via the zoom key 42, and all the lens units L1 through L5 advance or retreat in the optical axis direction 100 in accordance with the mechanism described above to effect zooming. Further, by the advancement/retreating of the third lens unit L3, the sub diaphragm unit 20 performs opening/closing operation to determine the aperture diameter.

On the other hand, the vibration type motor is driven at the time of automatic focusing, and the manual ring 31 is rotated at the time of manual focusing to rotate the focus key 32. As a result, in accordance with the above mechanism, the second lens unit L2 advances or retreats, to enable focusing.

Next, the movement path of each lens holding frame will be described with reference to FIG. 2.

FIG. 2 is a developed view of the guide tube 14 and the cam tube 15 in the WIDE state.

The bayonet claw 14a provided on the outer peripheral portion of the guide tube 14 and the bayonet groove 15a provided in the cam tube 15 are engaged with each other, so that the guide the cam tube 15 is retained to enable fixed-position rotation while regulating its movement in the optical axis direction 100.

Third unit cam grooves 14b causes the third unit holding frame 16 to advance or retreat in the optical axis direction 100. Rectilinear motion tube cam grooves 15c cause the rectilinear motion tube 24 to advance or retreat in the optical axis direction 100. The third unit cam grooves 15b and the rectilinear motion tube cam grooves 15c are respectively arranged at three positions at equal circumferential intervals.

Rectilinear motion grooves 14b causes the third unit holding frame 16 and the rectilinear motion tube 24 to make a rectilinear motion. Like the above-mentioned cam grooves, the rectilinear motion grooves 14b are also arranged at three positions at equal circumferential intervals.

Tool holes 15d performs parallel eccentricity adjustment on the fifth unit holding frame 22; when the cam tube 15 is rotated to the TELE state, it is in the same phase as tool holes 14b of the guide tube 14, thus allowing access to the eccentricity roller 22 from the outside.

The first unit holding frame 25 is retained by the rectilinear motion tube movement roller 27 via the rectilinear motion tube 24, so that it advances or retreats in the optical axis direction 100 along the path of the rectilinear motion tube cam groove 15c. Here, when the cam tube 15 is rotated in the direction A in the diagram, the rectilinear motion tube movement roller 27 moves to the mount side while in a state of 27W to 27M in the WIDE state. When the cam tube 15 is further rotated, it is reversed to the lens unit L1 side, and the rectilinear motion tube movement roller 27 moves to 27T in the TELE state.

The third unit holding frame 16 is retained by the third lens unit frame movement roller 17, so that it advances or retreats in the optical axis direction 100 along the path of the third unit cam groove 15b. The third unit cam groove 15b is a linear cam groove free from a change in lead. Thus, when the cam tube 15 is rotated in the direction A in the diagram, the third lens unit frame movement roller 17 moves by a fixed amount in accordance with the rotation amount of the cam tube 15 from 17W in the WIDE state, to 17T in the TELE state.

As described above, the interchangeable lens 2 of the present exemplary embodiment is a two-unit zoom lens composed of negative and positive lenses.

Next, the drip-proof structure, which constitutes a feature of the present exemplary embodiment, will be described with reference to FIGS. 2 and 3.

Figure 3A:
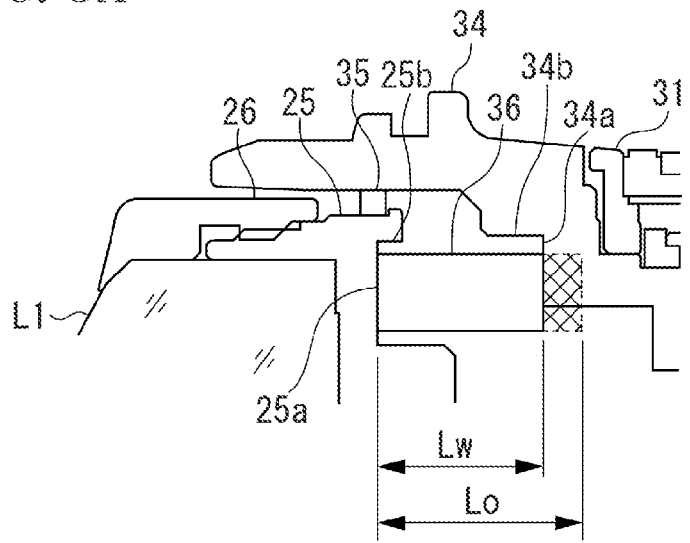
FIGS. 3A, 3B, and 3C are enlarged views of a main portion of a lens barrel according to an exemplary embodiment.
Figure 3B:
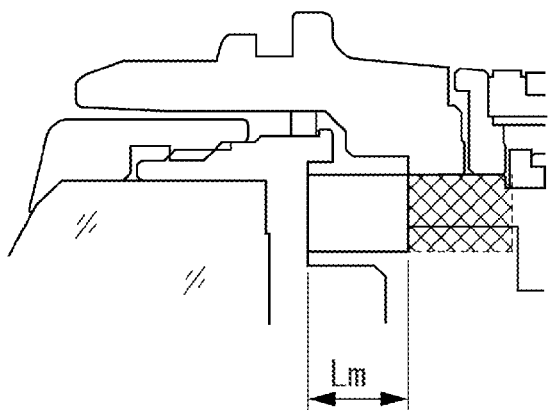
Figure 3C:
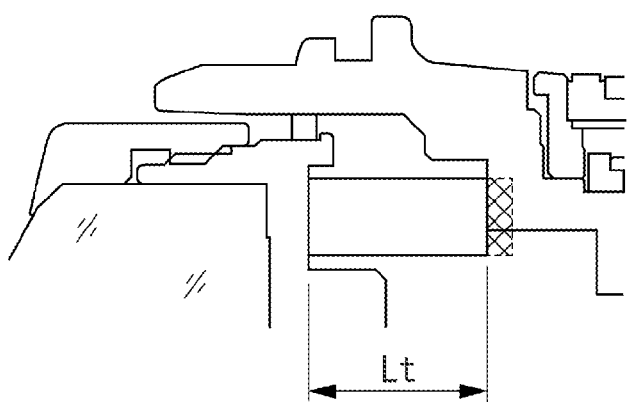

FIGS. 3A through 3C are enlarged views of a main portion constituting a feature of the present exemplary embodiment. FIG. 3A illustrates a state in which the rectilinear motion tube movement roller 27 is at position 27W (WIDE state). FIG. 3B illustrates a state in which the rectilinear motion tube movement roller 27 is at position 27M. FIG. 3C illustrates a state in which the rectilinear motion tube movement roller 27 is at position 27T (TELE state).

In the WIDE state illustrated in FIG. 3A, the elastic member 36 has been compressed from a free length L0 to a length Lw, which indicates the distance between the optical-axis-orthogonal surface 25a of the first unit holding frame 25 and the optical-axis-orthogonal surface 34a of the hood frame 34. The elastic member 36 consists of a semi-independent/semi-continuous bubble type ethylene propylene diene monomer (EPDM) rubber foam. For example, EPT SEALER manufactured by Nitto Denko Corporation is known. In a semi-independent/semi-continuous bubble type structure, independent bubbles and continuous bubbles are arranged in an irregular fashion in the pre-compression state, and after compression, its cells are turned into independent bubbles. Thus, the elastic member 36 allows compression with low stress; after compression, semi-independent bubble cells are turned into independent bubbles, so that it is possible to attain a high drip-proof performance.

The elastic member 36 is a member which is held between the optical-axis-orthogonal surface 34a of the hood frame 34 as the first member and the optical-axis-orthogonal surface 25a of the first unit holding frame 25 and which can be compressed in the optical axis direction 100 in zooming operation or focusing operation.

In the present exemplary embodiment, the elastic member 36 is formed in an annular configuration, so that the component can singly maintain its configuration. Thus, there is no need for folding at the time of incorporation into the device as in the case of a bellows-like member. Further, after its incorporation into the lens barrel, it is in a compressed state, so that it is held tight with resiliency between the optical-axis-orthogonal surface 25a of the first unit holding frame 25 and the optical-axis-orthogonal surface 34a of the hood frame 34.

Thus, there is no need to fix the elastic member 36, which is the semi-independent/semi-continuous bubble type member of the present exemplary embodiment, to one or both of the first unit holding frame 25 and the hood frame 34.

In the present exemplary embodiment, in order to enhance the shape maintaining property in the free state and to achieve an improvement in terms of assembly property, polyethylene terephthalate (PET) sheets are attached to both end surfaces of the elastic member 36.

Further, the first unit holding frame 25 is provided with a guide portion 25b extending in the optical axis direction 100 on the outer side of the elastic member 36; the guide portion serves both as a mark when arranging the elastic member 36 on the first unit holding frame 25 and as a guide at the time of operation. Further, the hood frame 34 is also provided with a guide portion 34b serving as a guide at the time of operation, thereby preventing the elastic member 36 from being twisted at the time of compression.

The guide portions 25b and 34b extending in the optical axis direction 100 are arranged adjacent to the semi-independent/semi-continuous bubble type elastic member 36 in order to suppress radial deviation of the elastic member.

Here, when the cam tube 15 is rotated in the direction A, and the rectilinear motion tube movement roller 27 is moved to position 27M, the elastic member 36 is compressed to the length Lm (the state of FIG. 3B). In this state, the elastic member 36 is compressed to the maximum degree; even when the compression rate increases, the repulsive force is not augmented substantially, so that no unevenness in the zooming operation torque is generated, and a high quality operational feed can be obtained.

When the cam tube 15 is further rotated in the direction A, the rectilinear motion tube movement roller 27 moves to the position 27T to attain the TELE state (the state of FIG. 3C). At this time, the length of the elastic member 36 is Lt; in the present exemplary embodiment, the compression amount is minimum in this state.

In the present exemplary embodiment, the terenmp 35, which is a shielding member, is wrapped around the outer portion of the first unit holding frame 25, so that further improvement in terms of drip-proof performance is achieved together with the arrangement of the elastic member 36.

As described above, when the structure of the present exemplary embodiment is employed, there is no need to perform any special operation such as folding the elastic member 36, which is arranged for the purpose of achieving a drip-proof performance, prior to the assembly; further, there is no need to perform fixing operation, etc. after the arrangement of the elastic member 36, and yet it is possible to provide a lens barrel of a high drip-proof and dust-proof performance in which sealing is reliably effected between two members while a distance therebetween changes at the time of zooming operation.

Although in the present exemplary embodiment the PET sheets are attached to both end surfaces of the elastic member 36, it is also possible to arrange an adhesive such as double-faced tape on one or both of the surface abutting on the optical-axis-orthogonal surface 25a of the first unit holding frame 25 and the surface abutting on the optical-axis-orthogonal surface 34a of the hood frame 34.

Further, while in the present exemplary embodiment one of the two members which change the distance between them in zooming operation is a stationary member, the present invention may be configured such that both members are movable members.

The present invention is not restricted to the above exemplary embodiments but allows various modifications without departing from the range of the gist thereof. For example, it is also applicable to an optical apparatus other than a single-lens reflex camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-163186 filed Jul. 20, 2010, which is hereby incorporated by reference herein in its entirety.

What is claimed is:

1. A lens barrel comprising: a first member; a lens holding frame configured to hold lens units moving in an optical axis direction to either zoom or focus the lens units; and an elastic member held between respective optical-axis-orthogonal surfaces of the first member and the lens holding frame, wherein the elastic member is compressed in the optical axis direction during a zooming or focusing operation.

2. The lens barrel according to claim 1, wherein the first member is a stationary member configured not to move in the optical axis direction.

3. The lens barrel according to claim 1, wherein the first member is a movable member configured to move in the optical axis direction.

4. The lens barrel according to claim 1, further comprising: a guide portion provided on at least one of the lens holding frame or the first member and extending in the optical axis direction and configured to suppress a radial deviation of the elastic member.

5. The lens barrel according to claim 1, wherein the elastic member is a semi-independent/semi-continuous bubble type member.

6. The lens barrel according to claim 1, wherein the elastic member is not fixed to the respective optical-axis-orthogonal surfaces of the first member and the lens holding frame.

7. An optical apparatus comprising: a lens barrel according to claim 1.

* * * * *